United States Patent
Lin et al.

(10) Patent No.: US 8,582,433 B2
(45) Date of Patent: Nov. 12, 2013

(54) WIRELESS COMMUNICATION NETWORK AND ADAPTIVE ROUTING COMMUNICATION METHOD THEREOF

(75) Inventors: Qiang Lin, Beijing (CN); Jun Tian, Beijing (CN)

(73) Assignee: Fujitsu Limited, Kawasaki (JP)

( * ) Notice: Subject to any disclaimer, the term of this patent is extended or adjusted under 35 U.S.C. 154(b) by 353 days.

(21) Appl. No.: 12/879,754

(22) Filed: Sep. 10, 2010

(65) Prior Publication Data

US 2011/0085442 A1    Apr. 14, 2011

(30) Foreign Application Priority Data

Sep. 10, 2009    (CN) .......................... 2009 1 0173078

(51) Int. Cl.
*H04L 12/26*    (2006.01)
*H04W 4/00*    (2009.01)

(52) U.S. Cl.
USPC ........... 370/235; 370/238; 370/229; 370/351; 370/395.31

(58) Field of Classification Search
USPC ..................... 370/235, 238, 395.31, 229, 351
See application file for complete search history.

(56) References Cited

U.S. PATENT DOCUMENTS

| | | | |
|---|---|---|---|
| 7,035,258 B2 * | 4/2006 | Alam et al. | 370/448 |
| 7,853,643 B1 * | 12/2010 | Martinez et al. | 709/244 |
| 8,125,998 B2 * | 2/2012 | Anto Emmanuel | 370/401 |
| 8,184,549 B2 * | 5/2012 | Wiley et al. | 709/224 |

FOREIGN PATENT DOCUMENTS

| | | | | | |
|---|---|---|---|---|---|
| EP | 0993156 A2 | * | 10/1999 | | H04L 12/56 |
| EP | 2 296 407 A1 | | 3/2011 | | |
| WO | WO 2007/22620 A2 | * | 11/2007 | | H04Q 7/22 |

OTHER PUBLICATIONS

ZigBee Standards Organization, ZigBee Specification, Jan. 17, 2008, Document 053474r17; p. 1, lines 16-21.*
Tian, Chinese Office Action mailed Feb. 5, 2013 for corresponding Chinese Application No. 200910273078.2, whole document.*
European Search Report dated Sep. 9, 2010 in corresponding European Patent Application 10170105.0.
Chinese Office Action mailed Feb. 5, 2013 for corresponding Chinese Application No. 200910173078.2.
European Office Action issued Jul. 16, 2013 in corresponding European Application No. 10170105.0.

* cited by examiner

*Primary Examiner* — Andrew Chriss
*Assistant Examiner* — Jose Perez
(74) *Attorney, Agent, or Firm* — Staas & Halsey LLP

(57) ABSTRACT

A wireless communication network includes a central node and a plurality of sub-nodes including relay nodes and terminal nodes. A method for adaptively selecting a route for communications in the network includes: generating a global routing table of the network based on a predetermined criterion, by the central node independently or in cooperation with a part of the relay nodes; generating a local routing table of each of the sub-nodes based on the global routing table, and informing the local routing tables to the respective sub-nodes to store the local routing tables in the respective sub-nodes, by the central node independently or in cooperation with a part of the relay nodes, the local routing table including paths from the corresponding sub-node to adjacent nodes; and adaptively selecting, by the sub-node, a path from the local routing table thereof for communications according to a predetermined rule.

10 Claims, 8 Drawing Sheets

WIRELESS COMMUNICATION NETWORK AND ADAPTIVE ROUTING COMMUNICATION METHOD THEREOF

CROSS-REFERENCE TO RELATED APPLICATIONS

This application claims the priority to Chinese Patent Application No. 200910173078.2, filed on Sep. 10, 2009, which is hereby incorporated by reference in its entirety.

FIELD OF THE INVENTION

The present invention relates to a wireless communication network, and more particularly, to a method for adaptively selecting a route for communication in a wireless communication network to reduce the chance of collision in network communications, and a wireless communication network in which the method is implemented. Particularly, the wireless communication network is a wireless sensor network.

BACKGROUND OF THE INVENTION

The wireless sensor network (WSN) is a wireless network formed ad hoc by great quantities of sensor nodes with low complexity, and each sensor node in the network includes a sensing module, a processing module, a communicating module, and a power module to carry out the three basic functions of data collection, data reception/transmission, and data forwarding. The wireless sensor network has the characteristics of high reliability, easy deployment and scalability. The advent of new-generation, smaller, cheaper, and low-power-consuming devices, the enhancement in data calculation and processing capability brought about by distributional calculation, and the development of Micro-Electro-Mechanical Systems (MEMS) together make it possible to develop multifunctional sensors with low production cost, low power consumption, small size, and short-distance communication capability, thus laying the ground for the generation and development of the wireless sensor network. The wireless sensor network does not require the support of fixed networks, is of characteristic of rapid deployment and strong resistance to damage, can be widely applied to such fields as the military, industry, construction, goods storage, smart housing, and environment protection, and therefore draws widespread attention.

Medium Access Control (MAC) protocol decides the mode whereby a radio channel is used, to allocate limited radio communication resources among sensor nodes. Power saving and high efficiency are important objectives in the study of MAC layer protocols of the wireless sensor network. IEEE 802.15.4 Standard is proposed by the IEEE Association of Standardization with respect to a Low Rate Wireless Personal Area Network (LR-WPAN), and is currently one of the most important protocols for the wireless sensor network. Beacon Management and Channel Access Control are two important functions in an IEEE 802.15.4 MAC sub-layer. Two communication modes, i.e., Beacon Enabled Communication and Beacon Disabled Communication, are provided for selection in LR-WPAN.

IEEE 802.15.4 Standard divides all wireless devices in networks into two classes, namely Full Function Devices (FFD) and Reduced Function Devices (RFD), of which the former can carry out all functions of the protocol, and the latter can only carry out some simple functions. Moreover, these devices are functionally divided into three types of nodes, namely a PAN coordinator, coordinators and common nodes (devices), of which the PAN coordinator is the master node of the entire network, and there may be only one PAN coordinator in a single IEEE 802.15.4 network; the coordinator usually achieves synchronization with surrounding nodes by sending beacons, and has the function of forwarding packets; and the common node only has simple transceiving functions and cannot forward packets. An FFD can function as a PAN coordinator, a coordinator or a common node, whereas a RFD can only function as a common node.

A peer-to-peer network is a key topological structure supported by the IEEE 802.15.4 Standard. When an effective coordinator is present in a peer-to-peer network, any two random nodes within the range of communication can communicate with each other.

In a beacon enabled network, a sink node periodically broadcasts a beacon frame. The beacon frame indicates the beginning of a superframe. Communication among sub-nodes makes use of time-slot-based CSMA/CA channel access mechanism, in which, whenever a sub-node needs to transmit a data frame or a command frame, it firstly positions the boundary of the next time slot, and then waits for a random number of time slots. After the waiting, the sub-node begins to detect the channel status—if the channel is idle, the sub-node begins to transmit data at the boundary of the next usable time slot, and if the channel is busy, the sub-node needs to wait again for a random number of time slots, check the channel status, and repeat the process until an idle channel appears.

In a beacon disabled communication network, the sink node does not transmit a beacon frame, and each sub-node makes use of a CSMA/CA mechanism, which is not divided by time slots, to access the channel. Communication process according to this mechanism is as follows: whenever a sub-node needs to transmit data or an MAC command, it firstly waits for a random period of time, and then begins to detect the channel status—if the channel is idle, the sub-node immediately begins to transmit data, and if the channel is busy, the sub-node needs to repeat the above processes of waiting for a random period of time and detecting channel status until it is possible to transmit data.

In the wireless sensor network, a node, particularly such as a coordinator and a common node, is usually powered by a battery with extremely limited capacity, and charging or replacement of the battery is often inconvenient or even impossible, thus leading to failure of the node in the wireless sensor network, and resulting in the breakdown of the entire network.

Accordingly, it is a key task in the study of the wireless sensor network as how to save power consumption of network nodes in the process of use of the wireless sensor network to hence elongate the life thereof.

In the traditional study of saving energy efficiency of the wireless sensor network, the conventional OSI layered protocol model of an IP network was usually employed. The model simplifies the complex network design, lowers the production cost, and enhances such performances as execution efficiency, but optimization thereof is usually carried out at a specific network layer, so that improvement over the network performance is relatively limited, and enhancement of energy efficiency is usually achieved at the expense of network delay performance. Presence of this problem restricts the wireless sensor network from being developed for the more potential real-time services. To break the bounds of traditional concept of hierarchy, to take as objective the optimization of network performance, to perform cross-layer optimization by unifying each layer of the network, and to achieve seamless interaction of information amongst each of the layers are progressively meaningful to guarantee network quality of service (QoS) and improve the overall performance of the network.

As a result, there is very wide room for application to research for excellent cross-layer optimization technology in wireless network to maximize the life of the network while guaranteeing time effectiveness of data.

For example, both Chinese Patent Applications No. 200810056455.X and 200710049792.1 have proposed methods for power consumption of wireless sensor networks based on cross-layer designs, and both of these employ the power saving mode of lowering network power consumption by controlling the transmission power of the node.

Adaptive regulation of network node power is a common concept in the current study of cross-layer power saving of the wireless sensor network, but as seen from the currently available wireless sensor network products, power regulation of sensor nodes at the physical layer requires a long initialization process, and is not applicable to the circumstances of frequent changes in network topological structure and data traffic.

Moreover, when other wireless communication networks are concerned, if there is restriction on energy, the problem of saving power for the network should also be considered.

SUMMARY OF THE INVENTION

The present invention is proposed in view of the aforementioned problems inherent in the state of the art. An objective of the present invention is to provide a method for adaptively selecting a route for communication in a wireless communication network, which method needs not to perform adaptive regulation of the network node power during the process of communication as is the case in the prior art, but updates/optimizes a global routing table and a local routing table at each sub-node by taking into consideration two factors, namely hop number and relay collision factor (including the number of occurrences of backoff and/or the number of packet losses), so as to enable each sub-node to adaptively select a route from the local routing table in accordance with information of the MAC layer to reduce collision as far as practically possible. Thus, time effectiveness of data packet transmission is effectively guaranteed, and excellent energy efficiency is ensured at the same time. Moreover, by setting a timeout threshold, the circumstance is avoided in which relay communication concentrates in a relay node (coordinator) for an unduly long period of time, thereby balancing communication on the entire wireless communication network, elongating the life of the entire network, and hence achieving the objectives to save power consumption and maximize the life of the network.

Another objective of the present invention is to provide a wireless communication network that implements the aforementioned method.

According to the first aspect of the present invention, there is provided a method for adaptively selecting a route for communication in a wireless communication network including a central node and a plurality of sub-nodes, of which the sub-nodes include relay nodes and terminal nodes, the central node has a function of routing control for communications in the whole wireless communication network, the relay node has a forwarding function, and the terminal node has a transceiving function, the method including:
generating a global routing table of the wireless communication network based on a predetermined criterion, by the central node independently or in cooperation with a part of the relay nodes;

generating a local routing table of each of the sub-nodes based on the global routing table, and informing the local routing tables to the respective sub-nodes to store the local routing tables in the respective sub-nodes, by the central node independently or in cooperation with a part of the relay nodes, the local routing table including paths from the corresponding sub-node to adjacent nodes, wherein the local routing tables of at least a part of the sub-nodes each include a plurality of paths; and adaptively selecting, by the sub-node, a path from the local routing table thereof for communications according to a predetermined rule.

According to the second aspect of the present invention, there is provided a wireless communication network, which includes a central node and a plurality of sub-nodes, of which the sub-nodes include relay nodes and terminal nodes, the central node has a function of routing control for communications in the whole wireless communication network, the relay node has a forwarding function, and the terminal node has a transceiving function, wherein the central node is configured to, independently or in cooperation with a part of relay nodes, generate a global routing table of the wireless communication network based on a predetermined criterion;

the central node is further configured to, independently or in coordination with a part of relay nodes, generate a local routing table of each of the sub-nodes based on the global routing table, and inform the local routing tables to the respective sub-nodes to store the local routing tables in the respective sub-nodes, the local routing table including paths from the corresponding sub-node to adjacent nodes, wherein the local routing tables of at least a part of the sub-nodes each include a plurality of paths; and the sub-node is configured to adaptively select a path from the local routing table of the sub-node for communications according to a predetermined rule.

According to the third aspect of the present invention, there is provided a node device in a wireless communication network, which node device includes a path control unit that includes:

a local routing table storing section, configured to store a path of the node device to adjacent node devices in the wireless communication network;

a collision determining section, configured to determine whether a relay collision factor in the current communication process of the node device exceeds a preset collision control threshold;

a timeout determining section, configured to determine whether the time, during which the relay collision factor in the node device never exceeds the preset collision control threshold, exceeds a preset timeout threshold; and a path selecting section, configured to select a new path again for communication from a local routing table stored in the local routing table storing section in accordance with the determination result of the collision determining section or the timeout determining section;

wherein, if the collision determining section determines that the current relay collision factor of the node device exceeds the preset collision control threshold, the path selecting section selects a new path again for communication from a local routing table stored in the local routing table storing section, and sets a message for reporting to a central node device of the wireless communication network about the number of occurrences of circumstance in which the current relay collision factor exceeds the preset collision control threshold; and if the collision determining section determines that the current relay collision factor of the node device does not exceed the preset collision control threshold, the timeout determining section determines whether the time, during which the relay collision factor of the node device never exceeds the preset collision control threshold, exceeds the preset timeout threshold; if the determination result of the timeout determining section is "YES", the path selecting section selects a path again for communication from a local routing table stored in the local routing table storing section.

According to the present invention, it is possible to reduce the chance of collision in network communications as far as practically possible, to save energy, and to guarantee time effectiveness of communication, and it is possible at the same time to maintain stability of network routing, to balance communication traffic among network nodes, and to prevent individual nodes from exiting the network due to overload, thereby elongating the life period of the entire network as far as possible.

The present invention achieves the objectives of saving power for the network and maximizing the life period of the network without the support of any additional hardware, possesses excellent expandability, and hence holds a good prospect for future application.

Preferably, the wireless communication network is a wireless sensor network.

These and other aspects of the present invention will become apparent with reference to the descriptions and accompanying drawings below. Specific embodiments of the present invention are particularly disclosed in the descriptions and accompanying drawings to illustrate certain modes of execution about the principles for implementation of the present invention. It should be appreciated, however, that the scope of the present invention is not restricted thereby. Instead, the present invention subsumes all variations, modifications and analogs thereof that fall within the spirits and principles of the attached claims.

A feature described and/or exemplified with regard to one embodiment can be used in the same or similar manner in one or more other embodiment(s), and/or be combined with or replace features of other embodiments.

As should be noted, the words "comprise(s)/comprising" and "include(s)/including" when used in the context of the Description mean the presence of a feature, an integral, a step or a component, but does not exclude the presence or addition of one or more other feature(s), integral, step(s) or component as well as group thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

DESCRIPTION OF THE DRAWINGS

The accompanying drawings therein included constitute a part of the specification to illustrate the embodiments of the present invention, and are utilized to explain the principles of the present invention together with the description. In the drawings.

DETAILED DESCRIPTION OF THE EMBODIMENTS

A wireless sensor network conforming to the IEEE 802.15.4 Standard is taken as an example below to describe the principles and embodiments of the present invention. However, it will be easily appreciated by those skilled in the art that the principles of the present invention as set forth below are not only applicable to the wireless sensor network, but to other wireless communication networks as well, as long as they have topological structures similar to the network structure described below. It is possible for a person skilled in the art to conceive of specific embodiments for implementing the principles of the present invention in other wireless communication networks based on the contents herein disclosed without any creative effort to be made, which embodiments thus should fall within the protection scope claimed in the claims of the present application.

In view of the balance between power consumption of the network and guarantee of time effectiveness of the network, the present invention proposes a cross-layer optimization design method for a power-saving wireless sensor network with regard to the topological structure of a peer-to-peer network, based on the IEEE 802.15.4 protocol, which is widely employed in the wireless sensor network.

The present invention optimizes routing tables stored in a PAN coordinator, coordinators and common nodes by introducing an MAC layer-network layer mapping mechanism to avoid or reduce collisions at the MAC layer, so as to reduce power consumption due to access collisions, thereby elongating the life of the wireless sensor network. It is possible, after introduction of the MAC layer-network layer mapping mechanism, to more rationally configure the routing tables, effectively reduce the number of packet losses, lower the probabilities of collision and data retransmission during simultaneous transmission from a plurality of nodes to the same and single destination node, reduce the time of nodes participating in competition for channel resources, increase the time of nodes sleeping, and hence more effectively save energy.

The present invention optimizes the global routing table formed during the process of network initialization, and stores at each sub-node a plurality of paths to the destination node and conforming to determination requirements to form a local routing table. Thus, when in communication, each sub-node can make use of the formed local routing table to reduce collisions at the MAC layer insofar as practically possible, thus avoiding the wastage of undue energy in invalid communication wait.

Embodiments of the present invention are described in greater detail below with reference to the accompanying drawings.

Figure 1:
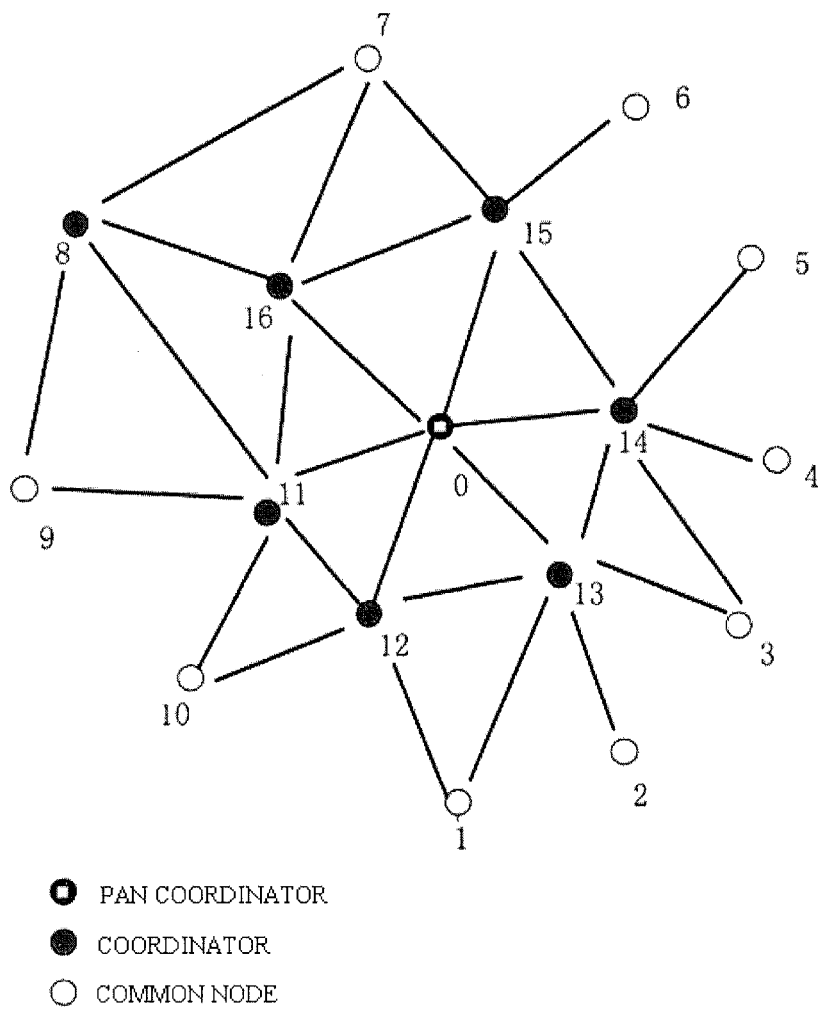
FIG. 1 illustrates an example configuration of a wireless sensor network.

FIG. 1 illustrates an example configuration of a wireless sensor network. The wireless sensor network employs a peer-to-peer network topological structure, and includes one central node (i.e., a PAN coordinator) 0 and a plurality of sub-nodes, which include seven coordinators 8, 11, 12, 13, 14, 15, 16 and nine common nodes 1, 2, 3, 4, 5, 6, 7, 9, 10. As should be noted, the numbers of coordinators and common nodes as listed herein are merely exemplary rather than restrictive.

Each node may include a sensing module, a processing module, a communicating module, and a power module to carry out the three basic functions of data collection, data reception/transmission, and data forwarding. However, the PAN coordinator, the coordinators and the common nodes are different in terms of such aspects as communication functions, processing capability and storing capability, etc.

The PAN coordinator has a function to perform routing control of the communication of the entire wireless sensor network, and it may be a computing device having sufficiently large storing capacity, sufficiently fast computation speed, assured power supply and capable of performing routing control of wireless communication.

The coordinator not only receives/transmits information from/to other nodes, but also has the relay function to forward information, i.e., it may function as a relay node. Alternatively, the coordinator can also have certain routing computation and control capacities and corresponding storing capacity, so as to assist the PAN coordinator in generating routing tables of the entire wireless sensor network, and to subsequently assist the PAN coordinator to perform routing control. In other words, a distributed routing control may be achieved by the PAN coordinator together with the coordinator. For example, in the case that the wireless sensor network is extremely large, it would be relatively time consuming to generate the global routing table by the PAN coordinator alone. In this case, it may be preferable to dispose coordinators having route generation and control functions at certain locations of the network, and these coordinators can detect nodes within a certain range therefrom under the coordination of the PAN coordinator to generate partial routing tables within the range, and to report these partial routing tables to the PAN coordinator. The PAN coordinator pieces together the partial routing tables received from the coordinators to generate the global routing table. In the subsequent communication process, the coordinators are responsible for updating their respective partial routing tables, and reporting the updated partial routing tables to the PAN coordinator, which in its turn updates the global routing table on the basis thereof. The following description is made by example of the case that the routing control is performed by the PAN coordinator alone. However, it is also possible to combine the principles according to the present invention to be described below with the mode of the PAN coordinator performing routing control in cooperation with other coordinators, which is advantageous for enhancing the operating efficiency of the entire network.

The common node may be a sensor of various types, and can detect various phenomena in surrounding environments including earthquake, electromagnetic wave, temperature, humidity, noise, light intensity, pressure, soil constituents, and size, speed and direction of a moving object, etc. However, the common node is restricted in all of its communication capability, storing capability and power storing capacity. It may receive/transmit information from/to the PAN coordinator and the coordinators, so as to receive instructions/feed back various physical quantities detected thereby. The storing capacity of the common node is also relatively small, and mainly used to temporarily store various information received from the PAN coordinator or the coordinators, and various physical quantities detected by the common node itself, as well as a local routing table including the paths of the node to the adjacent node. Moreover, restricted by its volume and position of distribution, the common node (sensor) is usually powered by a battery, so that its energy is greatly limited. This is also the reason why it is necessary to save power energy for the wireless sensor network.

Figure 2:
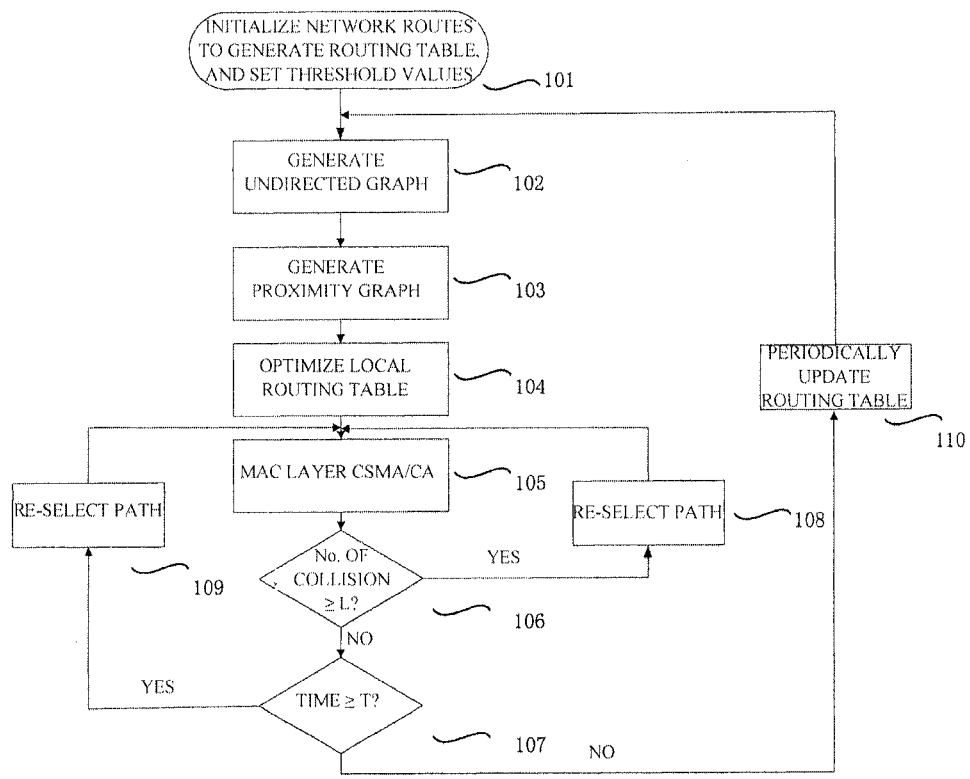
FIG. 2 is a flowchart illustrating a method for adaptively selecting a route for communications in a wireless sensor network according to an embodiment of the present invention.

The principles of the present invention are described in greater detail below in combination with the structure of the wireless sensor network as shown in FIG. 1, and with reference to the flowchart as shown in FIG. 2.

As shown in FIG. 2, a wireless sensor network of a peer-to-peer network topology is established based on IEEE 802.15.4 protocol in step 101.

A method based on node-degree (the degree of a node indicates the number of all neighboring nodes distanced by one hop from the node) is employed in the wireless sensor network, but unlike conventional methods, the present invention does not dynamically adjust the transmission power of the physical layer node, but finds the neighboring sub-nodes distanced by one hop from the physical layer node based on the initial power setting of the physical layer node. The flooding mode is employed to perform network initialization, namely a node that receives a data packet containing the initialization message such as a LifeMsg message forwards the data packet in a broadcasting mode, to transmit the data packet to other nodes except the one that transmits the data packet, until the initialization message arrives at all end nodes, i.e., common nodes.

The initialization message is initially broadcast by the PAN coordinator 0, and each of the sub-nodes transmits a response message such as a LifeAckMsg message upon reception of the initialization message; alternatively, a specific acknowledgement message packet to be returned may include ID information of neighboring nodes distanced by one hop from the sub-node. In the way of acknowledging hop by hop, it is possible to evaluate in the PAN coordinator the number of hops of each of the sub-nodes distanced from the PAN coordinator and respective paths, so as to form an initial global routing table.

Each sub-node may retain the ID information of the neighboring nodes distanced by one hop from the sub-node. Alternatively, some or all of the coordinators may retain the ID information of neighboring nodes distanced by more than one hop from the sub-nodes.

In addition, a collision control threshold L and a timeout threshold T are further set in the MAC layer in step 101. The values of the thresholds should be selected from the ranges permissible by the protocol or actual application scenarios. The two thresholds may be either dynamically set by the PAN coordinator 0 and notified to the sub-nodes in the broadcasting mode, or preset at each of the sub-nodes.

In step 102, the initial global routing table in the PAN coordinator 0 is modeled as an undirected graph $G=(V,E)$, where V represents a set of vertices in the initial global routing table, and E represents a set of edges in the initial global routing table. The element in E may be expressed as $l=(u,v)$, where $u,v \in V$, u represents the starting point of an edge, and v represents the terminating point of the edge. A weighting function for each edge is defined as:

$$\omega(u, v) = \begin{cases} \alpha \frac{1}{\min\{f(u), \text{Hop\_limit}\}} + (1-\alpha) \frac{1}{\min\{e(u, v), \text{Count\_limit}\}} & u \neq 0 \\ 0 & u = 0 \end{cases}$$

where f(u) represents the number of hops from vertex u to the PAN coordinator 0 in the undirected graph G. e(u,v) represents the number of occurrences of a relay collision factor, which is defined based on the number of occurrences of backoff and/or the number of packet loss, exceeding the collision control threshold L in the communication process of the edge l=(u,v) in the undirected graph G, and its value is initially set to be 0, and may be updated in future update of the global routing table. Hop_limit is a threshold value of number of hops from vertex u to the PAN coordinator 0, which is set to reduce the computational amount in generation of the undirected graph G, and its value may be set to be 2, for example. Count_limit is the maximum count value permissible for selection by a counting unit in the specific sub-node according to restrictions by the protocol, the method or the hardware device, etc. For example, in the embodiment of the present invention, three binary digits in the frame control domain of the data frame are utilized to perform interaction of control information, so that it is set that Count_limit≤$2^3$ −1=7. Of course, Count_limit may also be set to be other values. α is a balance factor, where 0≤α≤1, for example, α may be set to be 0.5 in the embodiment of the present invention.

Relay collision may occur when a plurality of transmitting nodes simultaneously transmit information to a single relay node (coordinator). The aforementioned relay collision factor is defined to reflect the degree of such a state. For example, when a transmitting sub-node needs to communicate with a coordinator, if the coordinator is communicating with another node, the sub-node will be in the waiting state. In this case, the sub-node intercepts in a random time interval whether there is an idle channel, and each time it is intercepted that there is no idle channel so as to deny the creation of communication, one backoff occurs. The number of occurrences of backoff of this sub-node may be counted as its relay collision factor. The use of the number of occurrences of backoff as the relay collision factor can only reflect the collision state in a relatively short time. When a predetermined number of occurrences of backoff occur, a packet loss may occur and thus the transmitting sub-node is required to perform retransmission. Accordingly, in order to reflect such collision over a relatively longer period of time, it is alternatively also possible to evaluate the relay collision factor in the current communication based on the number of packet losses alone or based on both the number of packet losses and the number of occurrences of backoff.

The relay collision factor is counted by a counter provided in the node. For every one occurrence of backoff, the counter increments by 1. If the counter has a relatively small capacity such as 2 bits, it can count at most three of occurrences of backoff. If the counter has a relatively large capacity such as 4 bits, the circumstances of packet losses may be considered.

In step 103, a proximity graph $G'_1$ is generated for each sub-node based on the undirected graph G generated in step 102, and the determination expression for generating $G'_1$ is as follows:

$$\max\{\omega_1, \omega_2, \ldots, \omega_i, \ldots, \omega_n\},$$

where $\omega_i$ represents the weight of each edge. The optimal path leading to the relay node and to be retained in the sub-node is determined based on the proximity graph $G'_i$. As can be known from the definition of the weighting function, the optimal path is selected in overall consideration of the number of hops from the sub-node to the PAN coordinator and the relay collision factor. During initialization, selection of the optimal path is made in consideration of only the number of hops from the sub-node to the PAN coordinator.

If it is needed to add routes, parameters in the aforementioned weighting function are further modified, for example, by increasing Hop_limit, to generate a proximity graph $G'_2$ based on G, and the determination expression for generating $G'_2$ is as follows:

$$\max\{\omega'_1, \omega'_2, \ldots, \omega'_i, \ldots, \omega'_n\}$$

where V ⊄ V'. In the above expression, $\omega'_i$ represents the weight of the respective edge of the undirected graph G having been removed of the proximity graph $G'_1$. The secondarily optimal path leading to the relay node path is retained in the sub-node based on the proximity graph $G'_2$.

The above process can be iteratively performed to add more paths for the sub-node. The number of iteration may be determined upon practical demand, and may also be limited by presetting a threshold.

The expression of the finally generated proximity graph is as follows:

$$G' = G'_1 \cup G'_2 \cup \ldots G'_i \ldots \cup G'_m,$$

where m represents the times number of iteration determined upon demand or by a preset threshold.

In the embodiments of the present invention, three binary digits of the frame control domain in the data frame can be used to perform interaction of control information.

In this case, the maximum number of paths retained by each sub-node is $2^3$=8, so that the number of paths generated through iteration should not exceed this maximum number.

In step 104, the PAN coordinator 0 informs each sub-node in the wireless sensor network of feature information of the generated proximity graph (for example, information representative of the edge l=(u,v), where u is the starting point of the path, and v is the terminating point of the path) by transmitting a route updating data packet either periodically or according to a predetermined plan, and the sub-node stores/optimizes its local routing table in accordance with the received feature information. During the network initialization, each sub-node receives feature information of the proximity graph transmitted from the PAN coordinator, and stores it as its own local routing table. In the subsequent process of network updating, each sub-node determines which path(s) should be added/deleted according to the transmitted feature information to optimize the previously stored local routing table.

In step 105, each sub-node performs communication at the MAC layer in accordance with the IEEE 802.15.4 protocol, and evaluates the relay collision factor in its current communication process.

The IEEE 802.15.4 protocol employs the CSMA/CA mechanism at the MAC layer. According to the CSMA/CA mechanism at the MAC layer, each transmitting node firstly intercept the channel before transmitting a frame. If the channel is idle, the transmitting node can transmit the frame; and if the channel is not idle, the transmitting node waits for a random period of time until it intercepts that a new idle channel occurs, and then transmits by precedence, thereby minimizing the probability of signal collision. After transmission of one frame, the transmitting node must wait again for a short time interval to check whether the receiving node returns an acknowledgement message ACK of the frame. If the ACK is received, it means that no collision occurred at this transmission, and the transmission is successful; if no ACK is received within a predetermined time, it means that collision occurred, and the transmission fails, so that the transmitting node retransmits the frame until the transmission is successful within a predetermined maximum number of retransmission.

It is determined in step 106 whether the relay collision factor of the sub-node exceeds the preset collision control threshold L within the set timeout threshold T. If the determination result is "YES", the process goes to step 108; if the determination result is "NO", the processes goes to step 107.

It is determined in step 107 whether the relay collision factor of the sub-node never exceeds the preset collision control threshold L within the set timeout threshold T. If the determination result is "YES", the process goes to step 109; if the determination result is "NO", the processes goes to step 110.

In step 108, the sub-node increments the value of the frame information field set in the data frame to be transmitted (for example, three binary digits reserved in the frame control domain, bits 7-9, and initial value being 000) by 1, and transmits the data frame to the PAN coordinator 0, to thereby inform the PAN coordinator of the number of occurrences of collision concerning the circumstance in which the relay collision factor exceeds the collision control threshold, for use in the next update of the routing table; subsequently, the sub-node queries its own local routing table, and newly selects the path leading to the predetermined relay node. In the case that there are other paths leading to the predetermined relay node to be selected in the local routing table, it is possible to select a path therefrom in ways such as weighted selection (in which certain edges are provided with priority, so that the chance for these edges being selected is higher than for other edges), random selection or cyclic selection. In the case that there is no new path to be selected in the local routing table, the original path is retained unchanged.

In step 109, the sub-node queries its local routing table, and selects anew the path leading to the predetermined relay node. In the case that there are other paths leading to the predetermined relay node to be selected in the local routing table, it is possible to select a path anew therefrom in ways such as weighted selection, random selection or cyclic selection. In the case that there is no new path to be selected in the local routing table, the original path is retained unchanged.

In the case that the sub-node has selected a new path, it can preferably reports the path change in the control domain of the data frame transmitted to the PAN coordinator, and alternatively, it can send a specific message to the PAN coordinator to report the path change.

In step 110, the PAN coordinator 0 updates the global routing table either periodically or in a scheduled plan according to the information in the frame information field contained in the MAC layer data frames, which are fed back by the sub-nodes. Then, the processes in steps 102 to 104 are repeated to optimize the local routing tables at the sub-nodes.

Thus, with the method of the embodiment of the present invention, since the local routing table of each sub-node can store a plurality of paths to the adjacent nodes and conforming to requirements, when relay collision in the communication process is severe to a certain extent, the transmitting node can switch the current path to another path in the local routing table, thereby avoiding long-period waiting, guaranteeing time effectiveness of communication, and also reducing energy wastage due to long-period waiting by the transmitting node.

Moreover, by properly setting the collision control threshold, it is also possible to avoid frequent change in the paths, to thereby maintain stability of network routing as far as possible.

Furthermore, by properly setting the timeout threshold, it is also possible to prevent a node (coordinator) from remaining in the communication state for a long time, and from exiting the network due to depletion of energy.

Therefore, according to the present invention, it is possible to reduce the chance of collision in network communications as far as practically possible, to save energy, and to guarantee time effectiveness of communication, and it is possible at the same time to maintain stability of network routing, to balance communication traffic among network nodes, and to prevent some nodes from exiting the network due to overload, thereby elongating the life period of the entire network as far as possible.

The embodiment of the present invention has been described in detail with reference to the flowchart of FIG. 2. However, it is not intended that that the present invention should include all of the steps shown in the flowchart. It is appreciated by persons skilled in the art that, based on the above description, a modification can be made by selecting a part of the mentioned steps, for example, by excluding steps 107 and 109, which can function to avoid collision in network communications as far as possible, thereby achieving the effect of saving energy, as compared to the prior art. Accordingly, such a modification also falls within the protection scope of the present invention. The spirit and scope of the present invention would be defined in the claims, and are not restricted by the specific description herein.

The collision control threshold L and timeout threshold T can be properly determined according to the scale of the network and the actual operational requirements. For example, if the scale of the network is relatively small, it is relatively easy to update the routing table, and thus the collision control threshold L can be set relatively small to guarantee real-time property of communication at each node as far as possible; whereas if the scale of the network is relatively large, it is desirable to maintain stability of the global routing table as far as possible, and then the collision control threshold L can be set relatively large.

In addition, it is also possible to differentially or dynamically set the collision control threshold L and timeout threshold T according to actual requirements of different node positions.

The principle of the present invention will be described by means of example hereinafter with reference to the wireless sensor network as shown in FIG. 1 and in conjunction with FIGS. 3a to 3d.

Firstly, as in step 101 in FIG. 2, network routes are initialized based on the node degree algorithm. For example, the PAN coordinator 0 generates the global routing table through broadcasting a LifeMsg message, to thereby generate a local routing table at each sub-node.

It is assumed that Hop_limit=2, Count_limit=0, and $\alpha$=0.5. A proximity graph G is generated based on the generated global routing table, and the generating process is as shown in Tables 1, 2 and 3.

For example, in case of sub-node 7, during the first optimization (namely initialization), since Hop_limit=2, paths such as 7-8-16-0, 7-8-11-0, 7-8-11-16-0 and 7-8-16-11-0 are deleted, the determination condition (the weight of the edge) is $$q = \frac{1}{4},$$

and members of the proximity graph are generated as 7-15-0/ (¼) and 7-16-0/ (¼). To add paths, a second optimization is performed. At this time, there is no path to be selected. The resultant members of the proximity graph are 7-15-0/ (¼), 7-16-0/ (¼).

In case of sub-node 12, during the first optimization (namely initialization), the determination condition is $$q = \frac{1}{2},$$

and a member of the proximity graph is generated as 12-0/ (½). To add paths, a second optimization is performed, the determination condition is $$q = \frac{1}{4},$$

members of the proximity graph are generated as 12-11-0/ (¼) and 12-13-0/ (¼), and the resultant members of the proximity graph are 12-0/ (½), 12-11-0/ (¼), 12-13-0/ (¼).

Figure 3A:
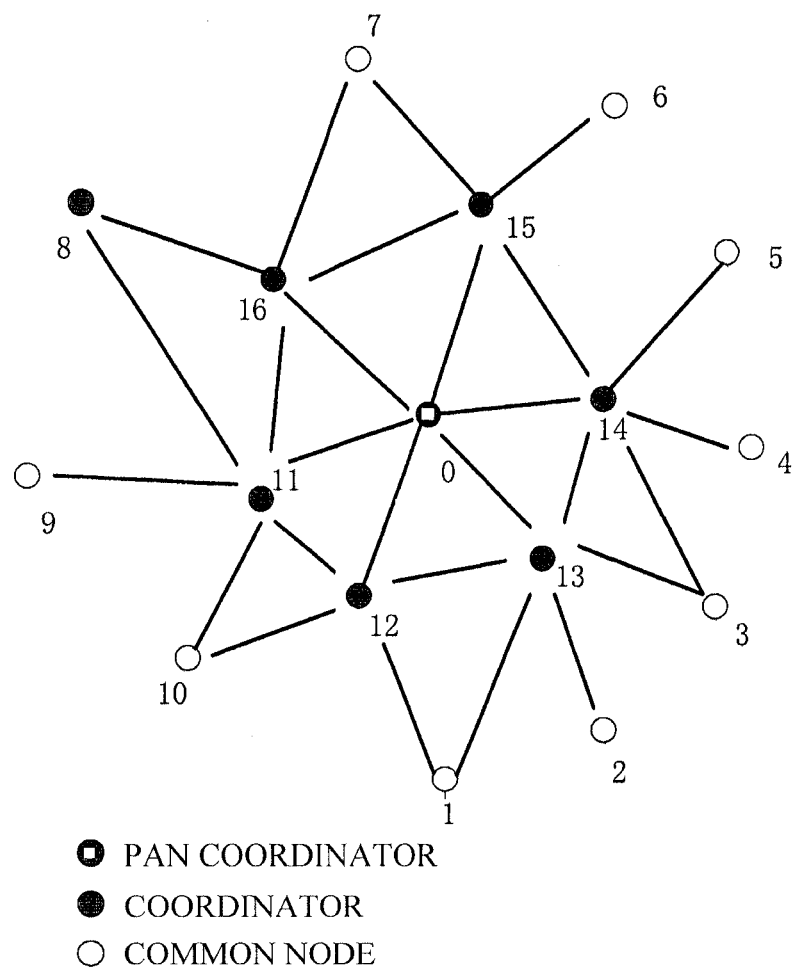
FIGS. 3a-3d are diagrams illustrating the configurations of the wireless sensor network, in which the method according to the present invention is employed, in various states.

The PAN coordinator informs the nodes of the aforementioned information by transmitting route updating data packets, so that each of the nodes stores the information as its local routing table, or optimizes the local routing table stored during the initialization in accordance with the information. The result is as shown in FIG. 3a.

Figure 3B:
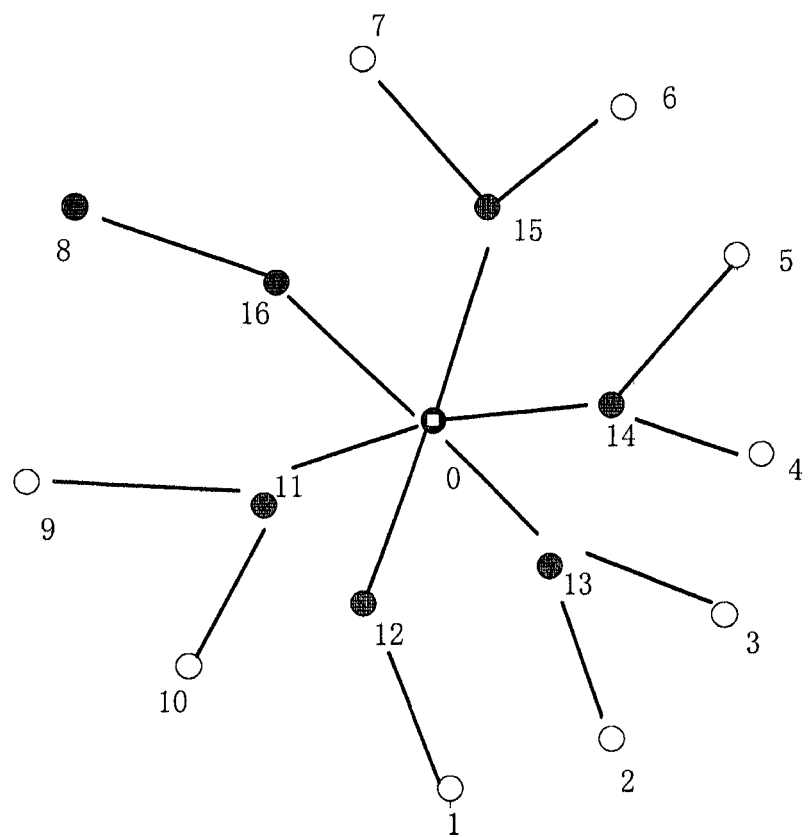

As shown in FIG. 3b, the generated wireless sensor network performs communication on the basis of IEEE 802.15.4, which, as previously mentioned, employs the CSMA/CA mechanism at the MAC layer.

Figure 3C:
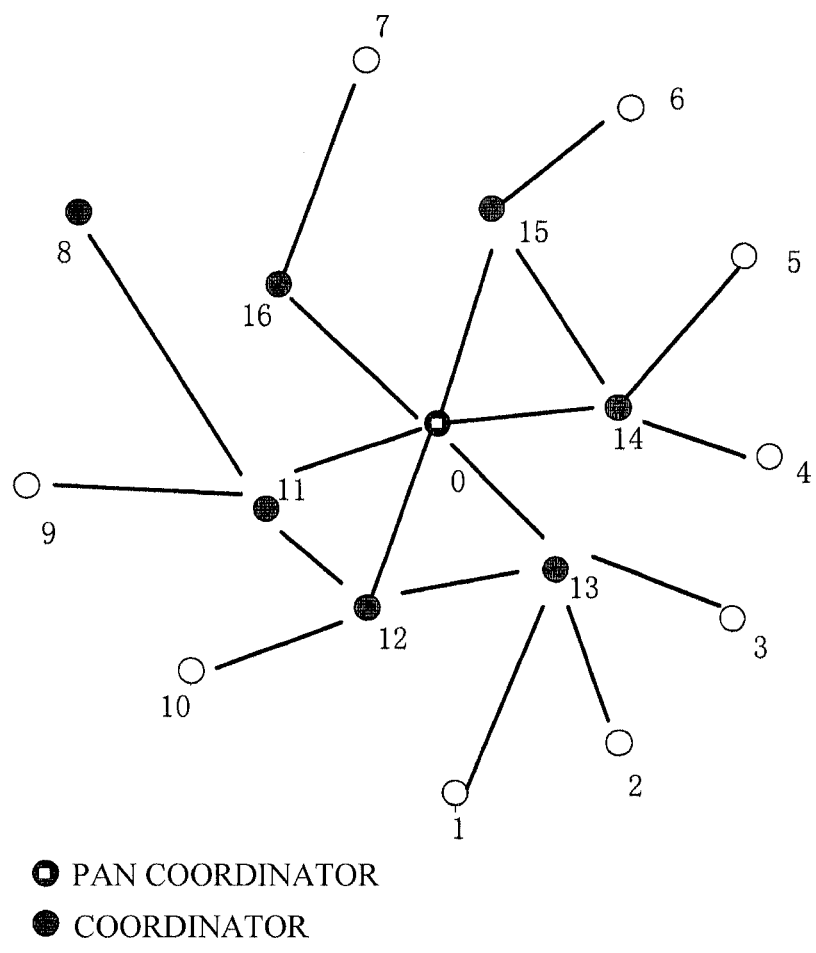

During the process of communication, if the circumstance occurs in which the relay collision factor (such as the number of occurrences of backoff) of a sub-node on the data transmission path exceeds the preset collision control threshold L within the prescribed timeout threshold T, the sub-node searches the local routing table to find a new path. For example, if the aforementioned circumstance occurs at sub-node 7, and if the path as originally used is (7, 15), the path may be changed to (7, 16), and the result after the change is as shown in FIG. 3c.

Figure 3D:
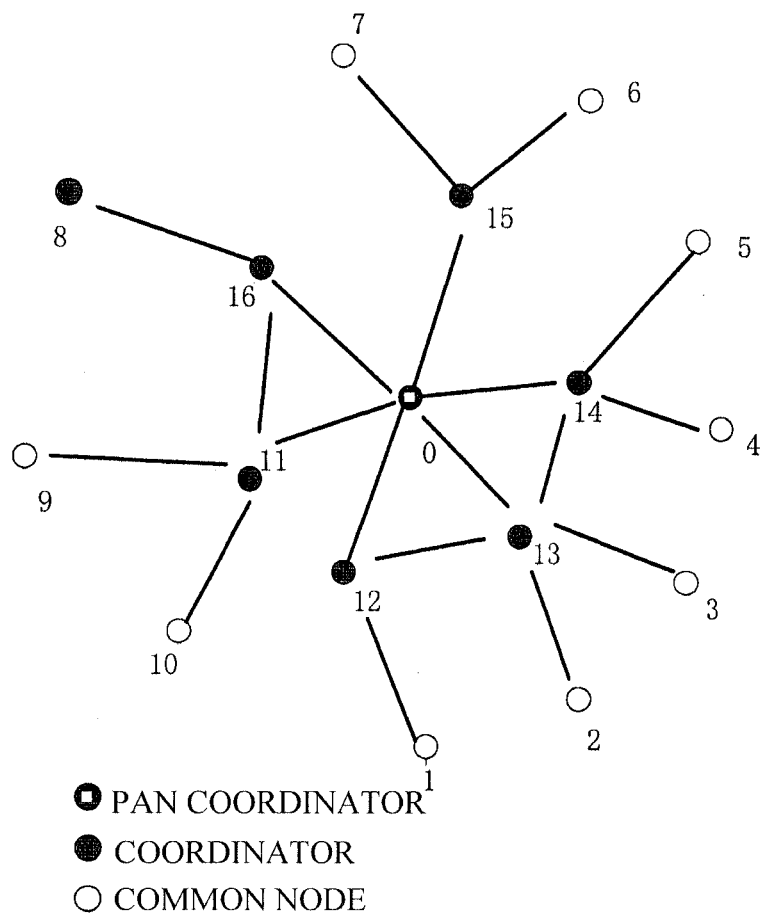

During the process of communication, if the time, during which the relay collision factor (such as the number of occurrences of backoff) does not exceed the collision control threshold L, exceeds a prescribed period of time (timeout threshold), the sub-node searches the local routing table to find a new path. For example, if the aforementioned circumstance occurs at sub-node 7, and if the path as originally used is (7,16), the path may be changed to (7,15), and the result after the change is as shown in FIG. 3d.

TABLE 1

Generation of Proximity Graph (First Iteration)

| Node Numbers | Selectable Paths/Weights | Maximum Weights | Proximity Graph Members |
|---|---|---|---|
| 1 | 1-12-0/(1/4), 1-13-0/(1/4) | 1/4 | 1-12-0/(1/4), 1-13-0/(1/4) |
| 2 | 2-13-0/(1/4) | 1/4 | 2-13-0/(1/4) |
| 3 | 3-13-0/(1/4), 3-14-0/(1/4) | 1/4 | 3-13-0/(1/4), 3-14-0/(1/4) |
| 4 | 4-14-0/(1/4) | 1/4 | 4-14-0/(1/4) |
| 5 | 5-14-0/(1/4) | 1/4 | 5-14-0/(1/4) |
| 6 | 6-15-0/(1/4) | 1/4 | 6-15-0/(1/4) |
| 7 | 7-15-0/(1/4), 7-16-0/(1/4) | 1/4 | 7-15-0/(1/4), 7-16-0/(1/4) |
| 8 | 8-16-0/(1/4), 8-11-0/(1/4) | 1/4 | 8-16-0/(1/4), 8-11-0/(1/4) |
| 9 | 9-11-0/(1/4) | 1/4 | 9-11-0/(1/4) |
| 10 | 10-11-0/(1/4), 10-12-0/(1/4) | 1/4 | 10-11-0/(1/4), 10-12-0/(1/4) |
| 11 | 11-0/(1/2), 11-16-0/(1/4), 11-12-0/(1/4) | 1/2 | 11-0/(1/2) |
| 12 | 12-0/(1/2), 12-11-0/(1/4), 12-13-0/(1/4) | 1/2 | 12-0/(1/2) |
| 13 | 13-0/(1/2), 13-12-0/(1/4), 13-14-0/(1/4) | 1/2 | 13-0/(1/2) |
| 14 | 14-0/(1/2), 14-13-0/(1/4), 14-15-0/(1/4) | 1/2 | 14-0/(1/2) |
| 15 | 15-0/(1/2), 15-14-0/(1/4), 15-16-0/(1/4) | 1/2 | 15-0/(1/2) |
| 16 | 16-0/(1/2), 16-15-0/(1/4), 16-11-0/(1/4) | 1/2 | 16-0/(1/2) |

TABLE 2

Generation of Proximity Graph (Second Iteration)

| Node Numbers | Selectable Paths/Weights | Maximum Weights | Proximity Graph Members |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | 11-16-0/(1/4), 11-12-0/(1/4) | 1/4 | 11-16-0/(1/4), 11-12-0/(1/4) |
| 12 | 12-11-0/(1/4), 12-13-0/(1/4) | 1/4 | 12-11-0/(1/4), 12-13-0/(1/4) |
| 13 | 13-12-0/(1/4), 13-14-0/(1/4) | 1/4 | 13-12-0/(1/4), 13-14-0/(1/4) |
| 14 | 14-13-0/(1/4), 14-15-0/(1/4) | 1/4 | 14-13-0/(1/4), 14-15-0/(1/4) |
| 15 | 15-14-0/(1/4), 15-16-0/(1/4) | 1/4 | 15-14-0/(1/4), 15-16-0/(1/4) |
| 16 | 16-15-0/(1/4), 16-11-0/(1/4) | 1/4 | 16-15-0/(1/4), 16-11-0/(1/4) |

TABLE 3

Resultant Proximity Graph

| Node Numbers | Proximity Graph Members |
|---|---|
| 1 | 1-12-0/(1/4), 1-13-0/(1/4) |
| 2 | 2-13-0/(1/4) |
| 3 | 3-13-0/(1/4), 3-14-0/(1/4) |
| 4 | 4-14-0/(1/4) |
| 5 | 5-14-0/(1/4) |
| 6 | 6-15-0/(1/4) |

TABLE 3-continued

Resultant Proximity Graph

| Node Numbers | Proximity Graph Members |
| --- | --- |
| 7 | 7-15-0/(1/4), 7-16-0/(1/4) |
| 8 | 8-16-0/(1/4), 8-11-0/(1/4) |
| 9 | 9-11-0/(1/4) |
| 10 | 10-11-0/(1/4), 10-12-0/(1/4) |
| 11 | 11-0/(1/2), 11-16-0/(1/4), 11-12-0/(1/4) |
| 12 | 12-0/(1/2), 12-11-0/(1/4), 12-13-0/(1/4) |
| 13 | 13-0/(1/2), 13-12-0/(1/4), 13-14-0/(1/4) |
| 14 | 14-0/(1/2), 14-13-0/(1/4), 14-15-0/(1/4) |
| 15 | 15-0/(1/2), 15-14-0/(1/4), 15-16-0/(1/4) |
| 16 | 16-0/(1/2), 16-15-0/(1/4), 16-11-0/(1/4) |

Figure 4:
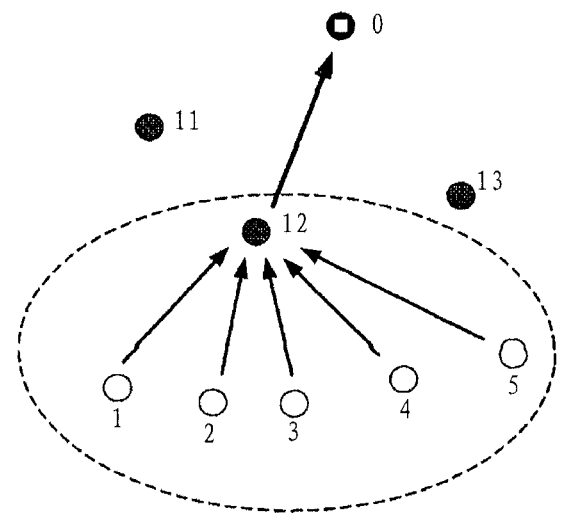
FIGS. 4 and 5 are diagrams of comparison between the circumstances of node communications before and after employing the method according to the present invention.
Figure 5:
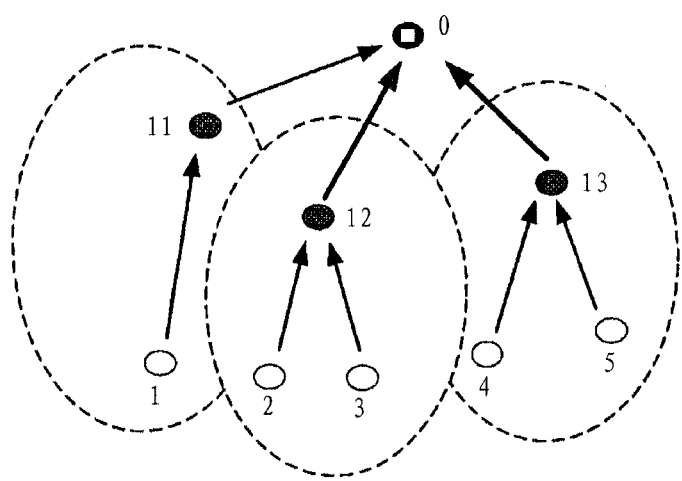

FIGS. 4 and 5 are views of comparison between communication states of the wireless sensor network before and after employing the method according to the present invention. As shown in FIG. 4, a plurality of common nodes 1, 2, 3, 4, 5 communicate with the PAN coordinator 0 through coordinator 12, while coordinators 11, 13 are in the idle state. Thus, on the one hand, some common nodes will consume additional energy due to the waiting state, and on the other hand, coordinator 12 consumes excessive energy. After application of the method according to the present invention, as shown in FIG. 5, the relay can be distributed across coordinators 11, 12, 13 to complete communication, which not only guarantees time effectiveness of communication at each node, but also saves energy for each node and maintains balance of the entire network, thereby elongating the life period of the network as a whole.

Figure 6:
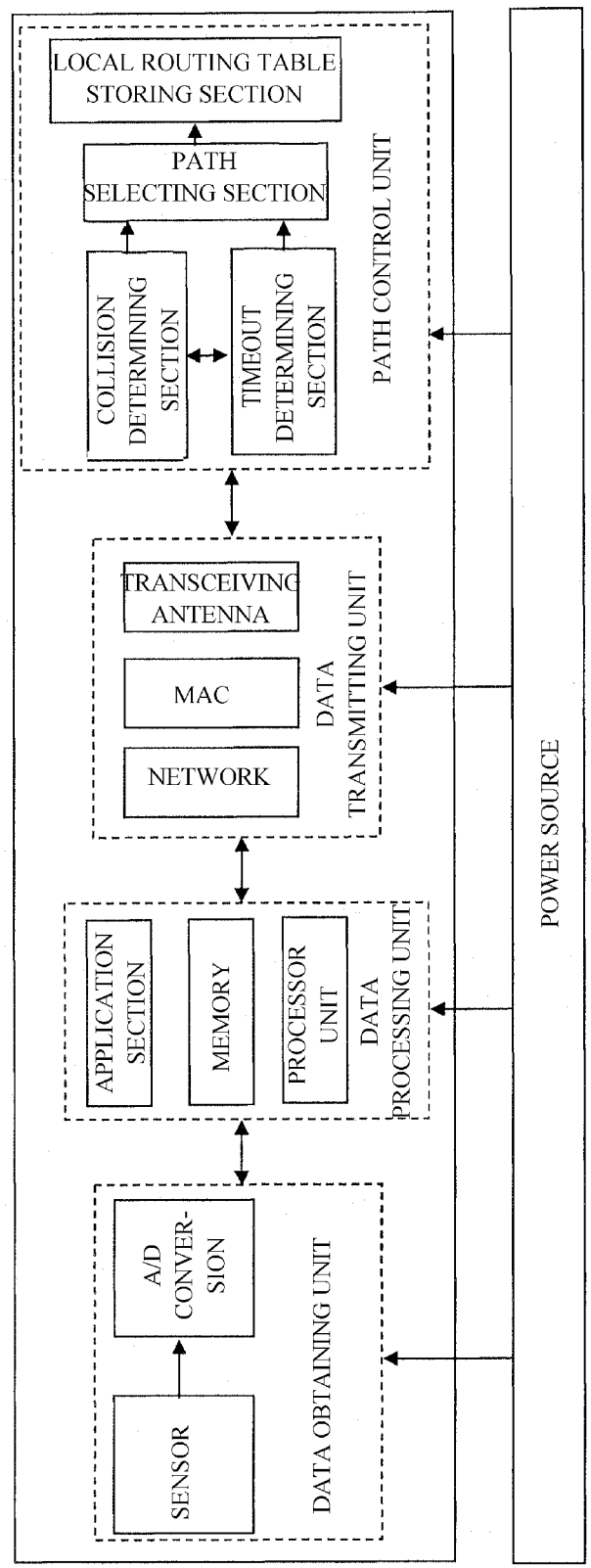
FIG. 6 is a structural block illustrating a sub-node in the wireless sensor network according to an embodiment of the present invention.

FIG. 6 is a block diagram illustrating the configuration of an example of a sub-node in the wireless sensor network according to an embodiment of the present invention.

As shown in FIG. 6, the sub-node includes a power source, a data obtaining unit, a data processing unit, a data transmitting unit, and a path control unit.

The power source may for example be a battery. The data obtaining unit includes a sensor and an A/D converter, for obtaining various measurement parameters. The data processing unit includes an application section, a memory, and a processor unit, for processing data obtained by the data obtaining unit. The data transmitting unit includes a network layer processing section, an MAC layer processing section, and a transceiving antenna, for packaging and transmitting data processed by the data processing unit. The power source, the data obtaining unit, the data processing unit, and the data transmitting unit are substantially the same as corresponding sections of a prior art node.

The sub-node according to the embodiment of the present invention distinguishes itself by further having a path control unit. The path control unit includes a local routing table storing section, a collision determining section, a timeout determining section, and a path selecting section. The local routing table storing section stores paths of the sub-node to adjacent nodes, and the collision determining section determines whether the relay collision factor (such as the number of occurrences of backoff) in the current communication process of the sub-node exceeds a preset collision control threshold. If the collision determining section determines that the relay collision factor (such as the number of occurrences of backoff) in the current communication process of the sub-node exceeds the preset collision control threshold, the path selecting section selects anew, from a local routing table stored in the local routing table storing section, another path leading to a predetermined relay node, adds by 1 the value of frame information field set in the data frame to be transmitted (for example, three binary digits reserved in the frame control domain, bits 7-9, and initial value being 000), and transmits the data frame to the PAN coordinator 0, to thereby inform the PAN coordinator 0 of the number of occurrences of collision concerning the circumstance in which the relay collision factor exceeds the collision control threshold, for use in the next update of the routing table. In the case there are other paths leading to the predetermined relay node to be selected in the local routing table, it is possible for the path selecting section to select a path anew therefrom according to many modes, such as weighted selection, random selection or cyclic selection. In the case there is no new path in the local routing table for selection, the path selecting section retains the original path unchanged. If the determination result of the collision determining section is "NO", the timeout determining section determines whether the time, during which the relay collision factor of the sub-node never exceeds the preset collision control threshold, exceeds a preset timeout threshold. If the determination result of the timeout determining section is "YES", the path selecting section selects anew, from a local routing table stored in the local routing table storing section, another path leading to the predetermined relay node. In the case there are other paths leading to the predetermined relay node to be selected in the local routing table, it is possible for the path selecting section to select a path anew therefrom according to many modes, such as weighted selection, random selection or cyclic selection. In the case there is no new path in the local routing table for selection, the path selecting section retains the original path unchanged. These processes are identical with the processes previously described with reference to FIG. 2.

Functional modules of the path control unit of the network node are described above. As should be noted, these functional modules can be implemented by programming the node without addition of any hardware. Implementation of the programming is easy for a person skilled in the art of computer programming, so that no description thereto is made here. Of course, it is also possible to provide dedicated hardware in the network node to carry out the aforementioned functions, but the functions are preferably carried out with software.

Brief description is made above only to the sections of the network node as relevant to the present invention, but network nodes capable of implementing the present invention are not restricted to the structure discussed above.

The wireless sensor network is taken as an example above to describe the present invention. However, as previously mentioned, the present invention is also applicable to other wireless communication networks, such as those that include central nodes (corresponding to the PAN coordinator), relay nodes (corresponding to the coordinators), and terminal nodes (corresponding to the common nodes). Although energy restriction in such wireless communication networks is not as strict as that in the wireless sensor network, application of the principles according to the present invention likewise reduces the chance of collision in network communications as far as practically possible, to thereby improve the performance of network communications. Upon perusal of the aforementioned description to the wireless sensor network, a person skilled in the art would find it easy to apply the principles of the present invention to the wireless communication networks, so that specific implementation thereof is not described in detail here.

Specific embodiments of the present invention have been disclosed herein. It will readily be appreciated by persons ordinarily skilled in the art that the present invention has other applications under other environments. As a matter of fact, there are also many other embodiments and implementations. The attached claims are by no means meant to restrict the scope of the present invention to the specific embodiments described above. In addition, any reference to "means for . . . " is directed to give a description of a device plus functions of elements and the claims, while any element not specifically referred to as "means for . . . " is not intended to be understood as an element of any device plus functions, even if the claim in case contains such wording as "means".

Although the present invention has been illustrated and described with respect to (a) specific preferred embodiment(s) or a plurality of specific embodiments, it is obviously possible for persons skilled in the art to conceive of equivalent modifications and variations on reading and comprehending the Description and the accompanying drawings. Especially with regard to various functions to be performed by the aforementioned elements (parts, components, means, and compositions, etc.), unless otherwise specified, technical terms (including the reference to "means") descriptive of these elements are intended to correspond to any random elements that perform specific functions of the elements (namely functional equivalence), even if the elements are structurally different from the structures disclosed to perform the functions in the exemplary embodiment(s). Moreover, although specific features of the present invention have been described above with regard to only one or several of the exemplified embodiments, it is nonetheless possible to combine these features with one or more other feature(s) of other embodiments upon practical demand and in consideration of advantage for any given or specific application.

What is claimed is:

1. A method for selecting a route for communications in a wireless communication network comprising a central node and a plurality of sub-nodes, the sub-nodes comprising relay nodes and terminal nodes, the central node having a function of routing control for communications in the whole wireless communication network, the relay node having a forwarding function, and the terminal node having a transceiving function, the method comprising:
generating a global routing table of the wireless communication network, by the central node independently or in cooperation with a part of the relay nodes through performing network initialization in a flooding method;
generating a local routing table of each of the sub-nodes based on the global routing table, and informing the local routing tables to respective sub-nodes to store the local routing tables in the respective sub-nodes, by the central node independently or in cooperation with a part of the relay nodes, the local routing table-comprising paths from a sub-node to adjacent nodes, wherein the local routing tables of at least a part of the sub-nodes each comprise a plurality of paths; and
selecting, by the sub-node, a path from the local routing table thereof for communications,
wherein the method further comprises:
setting a collision control threshold at each of the sub-nodes; and
when performing communications through a path selected from the local routing table of the sub-node, accumulating, by the sub-node, a relay collision factor with respect to the selected path, and if the accumulated relay collision factor exceeds the collision control threshold, selecting, by the sub-node, a new path from the local routing table, until the relay collision factor accumulated with respect to the selected path does not exceed the collision control threshold, wherein the relay collision factor is accumulated with respect to the number of occurrences of relay backoff or to a combination of the number of occurrences of relay backoff and the number of packet losses,
and wherein the method further comprises:
setting a timeout threshold at each of the sub-nodes; and
selecting, by the sub-node, a new path from the local routing table of the sub-node, if a continuous communication period of the sub-node over the selected path exceeds the timeout threshold.

2. The method according to claim 1, wherein the original path is retained when the local routing table has no new path therein.

3. The method according to claim 2, further comprising:
periodically updating, by the central node, the global routing table in accordance with feedback information from each of the sub-nodes.

4. The method according to claim 3, wherein when the global routing table is updated, the selected path is selected based on the number of hops from the sub-node to the central node, and the number of occurrences that the relay collision factor of the sub-node exceeds the collision control threshold during communications.

5. The method according to claim 1, wherein the wireless communication network is a wireless sensor network.

6. A wireless communication network comprising a central node and a plurality of sub-nodes, the sub-nodes comprising relay nodes and terminal nodes, the central node having a function of routing control for communications in the whole wireless communication network, the relay node having a forwarding function, and the terminal node having a transceiving function, wherein
the central node is configured to, independently or in cooperation with a part of relay nodes, generate a global routing table of the wireless communication network through performing network initialization in a flooding method;
the central node is further configured to, independently or in coordination with a part of relay nodes, generate a local routing table of each of the sub-nodes based on the global routing table, and inform the local routing tables to respective sub-nodes to store the local routing tables in the respective sub-nodes, the local routing table comprising paths from a sub-node to adjacent nodes, wherein the local routing tables of at least a part of the sub-nodes each comprise a plurality of paths; and
the sub-node is configured to select a path from the local routing table of the sub-node for communications,
wherein a collision control threshold is set at each of the sub-nodes, and
the sub-node is further configured, when performing communications through a path selected from the local routing table of the sub-node, to accumulate a relay collision factor with respect to the selected path, and if the accumulated relay collision factor exceeds the collision control threshold, to select a new path from the local routing table, until the relay collision factor accumulated with respect to the selected path does not exceed the collision control threshold,
wherein the relay collision factor is accumulated with respect to the number of occurrences of relay backoff or to a combination of the number of occurrences of relay backoff and the number of packet losses,
and wherein a timeout threshold is set at each of the sub-nodes, and
the sub-node is further configured to select a new path from the local routing table of the sub-node, if a continuous communication period of the sub-node over the selected path exceeds the timeout threshold.

7. The wireless communication network according to claim 6, wherein the sub-node is further configured to retain the original path when the local routing table of the sub-node has no new path therein.

8. The wireless communication network according to claim 7, wherein the central node is further configured to periodically update the global routing table in accordance with feedback information from each of the sub-nodes.

9. The wireless communication network according to claim 8, wherein the central node is further configured, when the global routing table is updated, to select the selected path based on the number of hops from the sub-node to the central node, and the number of occurrences that the relay collision factor of the sub-node exceeds the collision control threshold during communications.

10. The wireless communication network according to claim 6, wherein the wireless communication network is a wireless sensor network.

* * * * *